May 24, 1966  C. N. JORGENSEN ET AL  3,253,125
ACCOUNTING MACHINE RECORDING CONTROL MEANS
Original Filed Oct. 30, 1959  5 Sheets-Sheet 1

FIG.1

INVENTORS
CHESTER N. JORGENSEN
EDWARD S. STORK
LLOYD D. TURNER

BY

THEIR ATTORNEYS

May 24, 1966    C. N. JORGENSEN ET AL    3,253,125
ACCOUNTING MACHINE RECORDING CONTROL MEANS
Original Filed Oct. 30, 1959    5 Sheets-Sheet 4

INVENTORS
CHESTER N. JORGENSEN
EDWARD S. STORK
LLOYD D. TURNER
BY Louis A. Kline
Albert L. Sessler, Jr.
THEIR ATTORNEYS May 24, 1966   C. N. JORGENSEN ET AL   3,253,125
ACCOUNTING MACHINE RECORDING CONTROL MEANS
Original Filed Oct. 30, 1959   5 Sheets-Sheet 5

FIG.7

INVENTORS
CHESTER N. JORGENSEN
EDWARD S. STORK
LLOYD D. TURNER

BY
Louis A. Kline
Albert L. Sessler, Jr.
THEIR ATTORNEYS

United States Patent Office 3,253,125
Patented May 24, 1966

3,253,125
ACCOUNTING MACHINE RECORDING
CONTROL MEANS
Chester N. Jorgensen and Edward S. Stork, Dayton, and Lloyd D. Turner, Brookville, Ohio, assignors to The National Cash Register Company, Dayton, Ohio, a corporation of Maryland
Original application Oct. 30, 1959, Ser. No. 849,883, now Patent No. 3,067,930, dated Dec. 11, 1962. Divided and this application June 22, 1962, Ser. No. 204,407
3 Claims. (Cl. 235—61.9)

This application is a division of United States patent application Serial No. 849,883, filed October 30, 1959, now United States Patent No. 3,067,930, issued December 11, 1962.

This invention relates generally to accounting machines which operate in conjunction with magnetically coded ledger cards to enable the picking up of an old balance and other information from a ledger card and the subsequent recording of a new balance and other information on the ledger card at the end of an accounting transaction. In particular, the invention relates to such a machine in which identification information may be printed in connection with each accounting transaction on a continuous record member maintained within the accounting machine.

The present invention is adapted for use with an accounting machine of the type disclosed in the United States patent application Serial No. 610,754, filed September 19, 1956, by inventors Konrad Rauch et al., now United States Patent No. 2,947,475, issued August 2, 1960, but is not intended to be limited to use with such a machine.

In the above-cited Patent No. 2,947,475, the accounting machine there shown is capable of comparing a comparator number, such as an account number, manually set up on the machine for the first item entry in each accounting transaction, with the corresponding account number magnetically encoded on the ledger card. However, while comparison of account numbers could be made in that machine, no provision was made for the printing of the account number which was magnetically sensed from the ledger card on any of the various record members used in connection with the accounting machine. In many accounting systems, in order that each transaction may be related to a particular account, it is desirable that the account number which is sensed from the ledger card be printed on the journal sheet generated by the accounting machine, on which is maintained a running record of all of the accounting transactions.

The present invention provides means for accomplishing this desirable function. By means of a novel dual use of the signal sensed from the magnetically encoded ledger card during pickup of information therefrom, it has been made possible to effect the printing of the sensed account number on the journal sheet. In connection with this, various interlocks are provided to insure that the machine will not print incorrect account information, and that other information, such as date information, must be properly indexed before the machine will operate.

Accordingly, it is an object of the present invention to provide an accounting machine capable of sensing a control number from a first type of record member and recording the sensed control number on a second type of record member.

Another object of the invention is to provide an accounting machine capable of sensing a control number from a first type of record member and recording the sensed control number on a second type of record member, and also capable of preventing the recording when appropriate or desired.

With these and other objects, which will become apparent from the following description, in view, the invention includes certain novel features of construction and combinations of parts, a preferred form or embodiment of which is hereinafter described with reference to the drawings which accompany and form a part of this specification.

GENERAL DESCRIPTION

The present invention is shown embodied herein in an accounting machine of the type described and claimed in the previously-mentioned United States Patent No. 2,947,475, which is controlled from a ledger card on which are printed the usual amounts pertaining to the account, such as the checks and deposits, the balances after each transaction entry, the sign of the balance, the date, etc. In addition, the ledger card has recorded thereon magnetically the last balance and related data, such as a comparator number, which in this case is the account number; the sign of the balance; and the number of the line on which the next entry is to be printed on the ledger card.

A plurality of sensing and recording heads are provided on the accounting machine of the previously-mentioned Patent No. 2,947,475 for sensing the data which is magnetically encoded on the ledger card, and for erasing previously-stored data and recording new data thereon. The heads are electrically connected to data-retaining means in the accounting machine, so that data on the ledger card may be entered into the accounting machine, and so that data produced by the accounting machine may be recorded on the card. The machine is also controlled from a keyboard, on which data may be set to be printed on the card and to be combined with data read from the card to form new balances. In a new balance recording operation, the data pertaining to the new balances is printed on the ledger cards, the previous magnetically-stored data is erased, and the new balance and related data pertaining to the new balance are magnetically stored on the card in its place.

In addition to the usual interlocks which have been previously provided on bank posting machines, the machine described and claimed in the previously-cited Patent No. 2,947,475 is provided with further safeguards to insure correctness of the pickup operation. One of these safeguards is a check to be sure that all of the data has been sensed or read from cards. Failure to read any data will prevent the entry of the remaining data into the machine and will cause the card to be immediately fed from the machine.

Another of these safeguards is a check to be sure that the data which was read has been correctly entered into the machine by comparing the data actually set in the machine with the data actually recorded on the ledger card. This is accomplished by first reading the ledger card and controlling the setting of the machine according to the data which was read and then reading the card a second time and comparing the second reading with the actual setting of the machine. If there is no aggreement, the further normal operation of the machine is prevented, and only a corrective operation of the machine may take place.

A further safeguard cooperates with the above two safeguards to insure that over-printing on the ledger card will be avoided. This involves the automatic recording of the line number on the card corresponding to the line on which the next printing is to be made. Accordingly, if the number is read correctly and is correctly set in the machine, as indicated by the two safeguards previously mentioned, then the card will be positioned in the next operation with the proper line thereon in the printing position.

The accounting machine is provided with a further safeguard to insure correctness of entries. As previously described, a comparator keyboard is provided, on which a comparator number, such as the account number, may be set, and the number thus set up can be compared with the number read from the ledger card to insure that the check or the deposit is being posted to the correct account. Failure of the numbers to agree will cause the card to be fed from the machine immediately and will prevent the data from being entered into the machine.

These automatic safeguards and checking means, together with the usual interlocks and controls, insure virtually "error-proof" operations without the necessity of running proofs on work already performed.

The machine described in the previously-cited patent is provided with a data storage means, in which the balance is stored when it is read, and in which it is retained until it is determined that something has been read from each channel on the card and that there has been agreement between the account number read from the card and that set in the account number keyboard. If data was read from each channel on the card, and if the account numbers agree, then the balance is entered into the totalizer of the machine under control of the data storage means. If there is a failure to read data from any channel on the card, or if the account numbers do not agree, the card is immediately fed from the machine, as indicated above, and the balance is not entered into the totalizer of the machine. By thus storing the balance until it is determined that data has been read from all of the channels on the card, and until it is determined that there is agreement between the account numbers, incorrect entries and corrective operations of the machine are minimized.

This storage of the balance until the account number has been determined also enables a "stop payment" signal to be obtained to call the operator's attention to the fact that a "stop payment" order has been placed on the account and to enable the operator to examine the check, before the entry is made into the totalizer, to see whether it is the check upon which the "stop payment" was placed. This is accomplished by recording the "stop payment" number on the ledger card instead of the account number, so that the comparator mechanism will show a failure of comparison and will prevent entry of the balance whenever it is attempted to post to the account in the usual manner. Upon vertification that the check is not the one against which the "stop payment" order has been placed, it may be posted by setting the "stop payment" number in the comparator keyboard and operating the machine in the usual manner. In this manner, the posting of a check on which a "stop payment" order has been placed is prevented.

The accounting machine is also provided with extremely flexible controls which enable it to perform different types of operations involving reading and recording operations on the card. For example, with one setting of the controls, the card-reading operation may be eliminated, and data may be set up on the keys of the machine and recorded magnetically on the card. With another setting of the controls, a normal posting operation may take place involving the reading of the card to pick up the old balance, the entering of checks and/or deposits by operating the machine under the control of the keys, and the recording of the new balance on the card. With a further setting of the controls, the machine may be controlled to transfer certain stored data from one card to another, as at the end of the month or accounting period, and in this operation data is read from a card and set up in the machine, the old card is removed from the machine and a new card is put into the machine, and certain of the data which was read is recorded on the card. With still a further setting, the controls will be effective to cause the machine described in the previously-mentioned United States Patent No. 2,947,475 to operate in a trial balance operation, in which the stored data is read, the old balance and the check count are entered into the machine, and the card is ejected without erasure of the stored data or recording of any further data thereon. It may be noted, however, that the check count information is not included in systems utilizing machines embodying the present invention.

For a more detailed description of construction and operation of those parts of the accounting machine which do not form a part of the present invention, reference may be had to the previously-mentioned United States Patent No. 2,947,475.

In the machine of the present invention, certain of the data to be stored upon the magnetic ledger cards has been changed. Also, structural changes have been made to permit the printing of an account number on the accounting machine journal strip.

DETAILED DESCRIPTION

Figure 1:
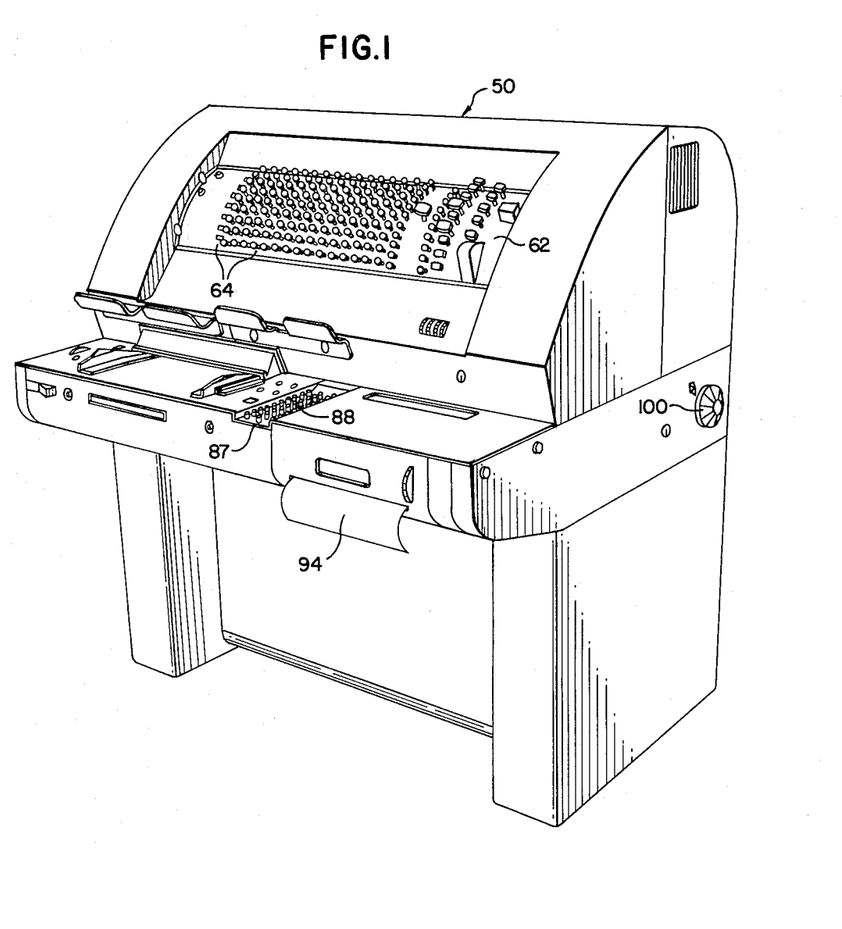
FIG. 1 is a perspective view of the machine embodying the present invention.

*Ledger card.*—An accounting machine 50 embodying the present invention is shown in perspective in FIG. 1 and, as previously indicated, is adapted to be controlled by data magnetically recorded on a ledger card 51 (FIG. 2) having means thereon to store this data.

The ledger card 51 which is used to control entries into the machine 50 is vertically lined on its front side to provide a plurality of columns for receiving records of entries. In its normal use, after the card is completed, or at the end of an accounting period, it is separated into two parts along a line 52, one of which parts will be sent to the customer, and the other of which parts will remain with the organization using the machine, for record-keeping purposes. Accordingly, the columns on one side of the line 52 are the same as the columns on the other side of the line 52, and these columns include spaces for "Reference No.," "Checks," "Deposits," "Date," and "Balance." All of the information relating to the various columns on both sides of the line 52 is mechanically printed upon the ledger card by the accounting machine during its operation. Typical numerical entries are printed for purpose of illustration upon certain lines in the ledger card 51 shown in FIG. 2.

Figure 2:
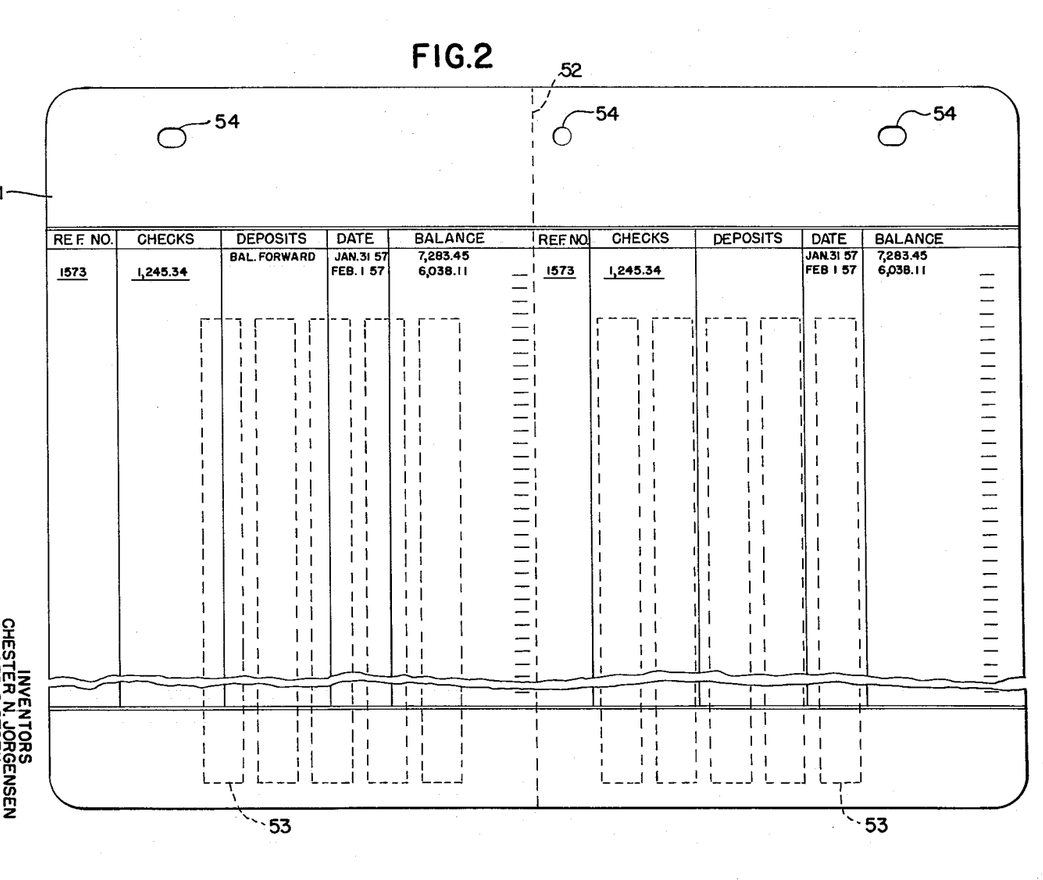
FIG. 2 is a view of a ledger card supplied with magnetizable areas for controlling the machine.

The card 51 is provided on its rear side with ten strips or areas 53, of magnetizable material, which can be distinctly magnetized to represent data. Each area 53 may provide two channels in which data can be stored, which data can be used to control the machine to enter the data therein or to provide other related controls.

In order that the card 51 may be clamped securely to the card carriage of the accounting machine 50, and in order that the card may be aligned properly with the printing mechanism of such machine and with the reading and recording heads thereof, the carriage is provided with locating pins adapted to cooperate with openings 54 near the top of the card, to insure that the card will be fed into and out of the machine in proper alignment with the heads and the printing mechanism. The holes 54 not only insure that the ledger card 51 is correctly positioned with respect to the reading and recording heads 55 (FIG. 7) and with respect to the printing mechanism of the accounting machine, but also insure that the ledger card is positioned on the card carriage right side up, the intermediate hole 54 being offset from the center of the card. This intermediate hole 54 acts as the main locating hole, and the two side holes 54 are elongated to allow for slight changes in the width of the ledger card due to temperature and humidity changes and to provide greater bearings area between the pins and the card.

*Dual account number and reference number printing and check-back control.*—As has been described in the parent application, Serial No. 849,883, the four rows of keys 64 (FIGS. 1 and 3) on the keyboard 62 are used for indexing of a reference number into the accounting machine 50 in connection with each check or deposit item. During item posting operations, depression of a key 64 (FIG. 3) controls the differential mechanism for that bank, shown generally at 220, to set a ring gear 221, through a link 222, and a segment arm 223, according to the key indexed, to effect printing of that reference number on the ledger card 51 and the journal sheet 94 (FIG. 1) during cycling of the accounting machine. The operation of the differential mechanism will not be described in detail, since it is the same as the operation of the differential mechanism for the amount banks, previously described in the parent application, Serial No. 849,883.

Figure 3:
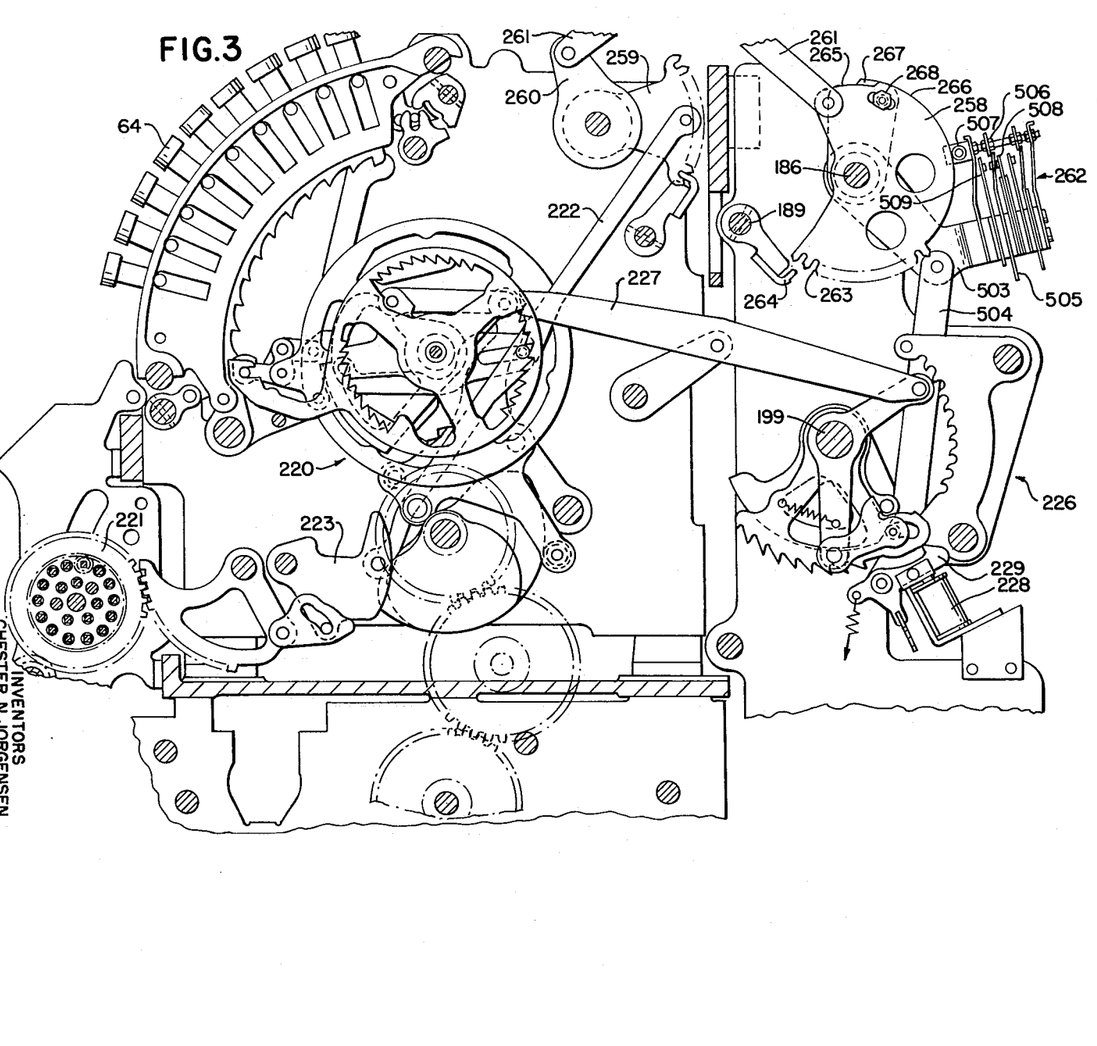
FIG. 3 is a cross-sectional view showing one of the differential mechanisms and associated mechanism used for entering account number and reference number data into the machine.

During balance pickup operations, the differential mechanism 220 for each of the three right-most reference number banks is controlled by the auxiliary differential mechanism, shown generally at 226 in FIG. 3, through the stop arm 227, rather than by means of the keys 64, which are not depressed in balance pickup operations. The various orders of the account number, magnetically encoded in certain of the magnetic strips 53 of the ledger card 51, are sensed by the reading heads of the accounting machine 50. The resulting signal, in each instance, causes deenergization of one of the solenoids 228 to release an associated pawl 229, and thus set the corresponding auxiliary differential mechanism 226 according to the number encoded, in the manner previously described in connection with the amount differential and auxiliary differential mechanisms shown in the parent application, Serial No. 849,883. The auxiliary differential mechanism then controls the differential mechanism 220 through the arm 227 to position the ring gear 221 for control of printing.

It is thus seen that the printing mechanism controlled by the differential mechanisms corresponding to the banks of keys 64 (FIG. 1) is set according to information indexed into the keyboard 62 on the keys 64 during an item posting operation, and is set according to account number information magnetically encoded on a ledger card 51 during a balance pickup operation. Controls which will be subsequently described are provided to cause the reference number information to be printed on both the ledger card 51 and the journal sheet 94, while the account number information is caused to be printed only on the journal sheet.

A check-back and recording control plate 258, free on the shaft 136, is also set by the differential mechanism 220 acting through the link 222, a segment 259, to which said link is connected, an arm 260 secured to said segment, and a link 261 connecting the arm 260 to the plate 258. The plate 258 functions to control the operation of certain switches shown generally at 262 in check-back and recording operations. The functioning of these switches will be subsequently explained in the description of the operating circuitry of the machine. The control plate 258 is provided with aligning teeth 263, engaged by an aligner 264, secured to the shaft 189, which is rocked at the proper time to align the control plate 258 in set position after it has been set under control of the differential mechanism 220.

The control plate 258 is formed with a smaller diameter, as at 265, and a larger diameter, as at 266, which are interconnected by a rise. As the control plate 258 is set to different positions by the differential mechanism, the rise will be set to different positions to provide the required controls for check-back and recording operations. In order that the point of rise between the smaller diameter and the larger diameter can be accurately set, an auxiliary plate 267 having the smaller diameter, the larger diameter, and a similar rise, is mounted adjacent the control plate 258, for limited movement relative thereto, and is secured in adjusted position relative to the plate 258 by a clamping unit 268. Accordingly, each individual control plate can have its rise accurately adjusted in order that its control over the groups of contacts, as 262, can be precisely timed with relation to the movement of the ledger card 51 past the reading and recording heads 55.

Figure 4:
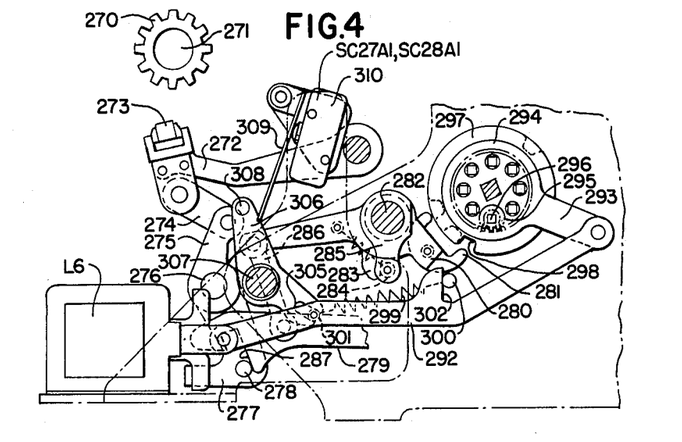
FIG. 4 is a detail view showing the solenoid control means for the journal printing mechanism, for controlling printing of the account number on the journal sheet.

*Account number printing on journal strip.*—A printing mechanism shown in part in FIG. 4 is provided for printing information on the journal sheet 94, and is similar in many respects to the ledger-card-printing mechanism shown in the parent application, Serial No. 849,883.

Type wheels 270 for printing on the journal sheet are mounted on a shaft 271 in groups, with one group being provided for each column of the journal sheet to be printed. The printing wheels in each group are positioned from the various differential mechanisms through internal drive gears, as described in connection with the mechanisms shown in the parent application, Serial No. 849,883.

An individual hammer 272 is provided for each group of wheels 270 and is controlled by notched control plates in the same manner as described in connection with the ledger-card-printing mechanism shown in the parent application, Serial No. 849,883. Each printing hammer is provided with a platen 273 and has connected thereto a link 274, which in turn is connected to an arm 275, forming a toggle connection. The arm 275 is pivoted on a shaft 276. Also connected to the arm 275 is an arm 277, carrying a stud 278. Associated with each stud 278 is a link 279. The link 279 is cam-operated in regular movement in the same manner as the link 244 of FIG. 9 of the parent application, Serial No. 849,883.

The hammer 272 which is to be operated is selected under control of means comprising notched plates set under control of the transaction banks, in the same manner as described in connection with the mechanism of the ledger-card-printing mechanism shown in the parent application, Serial No. 849,883. Coacting with the respective notched plate is a feeler arm 280, on which is supported a two-fingered pawl 281. The arms 280 are pivoted on a shaft 282, and each arm 280 is provided with a finger 283, held in engagement with a stud 284, on an arm 285, secured to the shaft 282. The free end of the feeler arm 280 is provided with a link 286, pivoted to the previously-mentioned link 279. The forward end of the link 279 is provided with a notch 287, which may be lowered into engagement with its associated stud 278.

During the operation of the machine, when the printer cam shaft 230 is operated, the arm 285 is rocked to move the feeler arm 280 and the feeler pawls 281 toward their associated notched plate or plates. If the feeler arm 280 and the feeler pawls 281 are permitted to drop into notches, the arm 280 is rocked counter-clockwise, as shown in FIG. 4, thus lowering the link 286 and engaging the notch 287 of the link 279 over the stud 278 of its associated printing hammer mechanism. Thereafter, during machine operation, the link 279 is moved to the right, as viewed in FIG. 4, and, through the stud 278, rocks the arm 277 counter-clockwise, which straightens the toggle consisting of the arm 275 and the link 274, thus raising the hammer 272 to make an impression on the journal sheet.

If, on the other hand, the feeler arm 280 and the feeler pawls 281 are opposite a high surface on the notched control plate, the arm 280 is prevented from rocking counter-clockwise, and the notch 287 in the link 279 is not lowered into engagement with the stud 278 on the arm 277. Therefore, the subsequent movement to the right of the link 279 will be merely an idle movement, and the toggle composed of the arm 277 and the link 274 will not be straightened to raise the hammer 272.

An additional means for controlling a journal printing operation is provided, and, as shown in FIG. 4, includes a solenoid L6 secured to the machine framework. The operating member of the solenoid is pivotally connected to one end of a link 292, which is pivotally connected at its other end to a projection 293 formed on a circular member 294 rotatably mounted on the internal gear control unit for the journal sheet printing mechanism.

The member 294 is provided with a central circular cut-out portion having internal gear teeth which cooperate with teeth on a pinion 295 in the internal gear control unit. The pinion 295 is fixed on a square shaft 296 and controls the movement of a plate 297 having a notch 298.

A spring 299, secured at one end to a stud 300 in the machine framework, and at the other end to a stud 301 fixed on the link 292, is effective to urge the link 292 normally to the right, as shown in FIG. 4, so that a surface 302 on said link engages the stud 300 in the machine framework.

The stud 301 on the link 292 also engages a notch 305 on a lever 306 free on a shaft 307 supported in the machine framefork. At its upper end, the lever 306 is provided with a stud 308 adapted to engage an actuator 309 of a switch 310 mounted in the machine frameworg and comprising the contacts SC27A1 and SC28A1.

When the solenoid L6 is energized by means which will subsequently be described in the explanation of the electrical circuitry of this invention, the link 292 is shifted to the left, as viewed in FIG. 4, against the force of the spring 299. This rocks the projection 293 and its associated member 294 clockwise. This movement is effectively transmitted through the pinion 295 and the shaft 296 to the plate 297 and rotates said plate to position the notch 298 out of the path of the feeler pawl 281. A high surface is accordingly presented to the pawl 281, and this is effective to prevent printing, in the manner previously described in connection with the ledger-card-printing mechanism shown in the parent application, Serial No. 849,883.

In addition, shifting of the link 292 and the stud 301 thereon acts, through the lever 306, the stud 308, and the actuator 309, to operate the contacts SC27A1 and SC28A1 of the switch 301. The manner in which these contacts function in the overall operation of the machine will be subsequently described in the explanation of the electrical circuitry.

*Operating circuitry.*—A plurality of operating circuits are provided to interrelate the operation of the mechanical components previously described in this specification and to enable them to cooperate in a manner to perform the desired accounting operations which are comprehended by the objects of the present invention. Many of the circuits employed in the accounting machine embodying the present invention are identical or similar to the circuits disclosed in the previously-cited Patent No. 2,947,475, and a description of such circuits will not be repeated herein. The present description will be limited to circuits not contained in the machine described in the above-cited patent, or to circuits which have been substantially modified from the form in which they appear in said patent, in order to perform the particular functions accomplished by the present invention.

*Card-reading circuit.*—The card-reading circuits for enabling reading of certain ones of the twenty channels on the ledger card 51 remain the same in the present invention as shown in the previously-cited Patent No. 2,947,475. However, the card-reading circuits for the channels on the ledger card used to store account or comparator number information have been modified so that each is operable to provide a dual function of simultaneously setting two different auxiliary differential mechanisms, one of which is the conventional comparator number auxiliary differential mechanism disclosed in Patent No. 2,947,475, and the other of which is the auxiliary differential mechanism disclosed in FIG. 3 for controlling printing of the comparator numbers.

Figure 7:
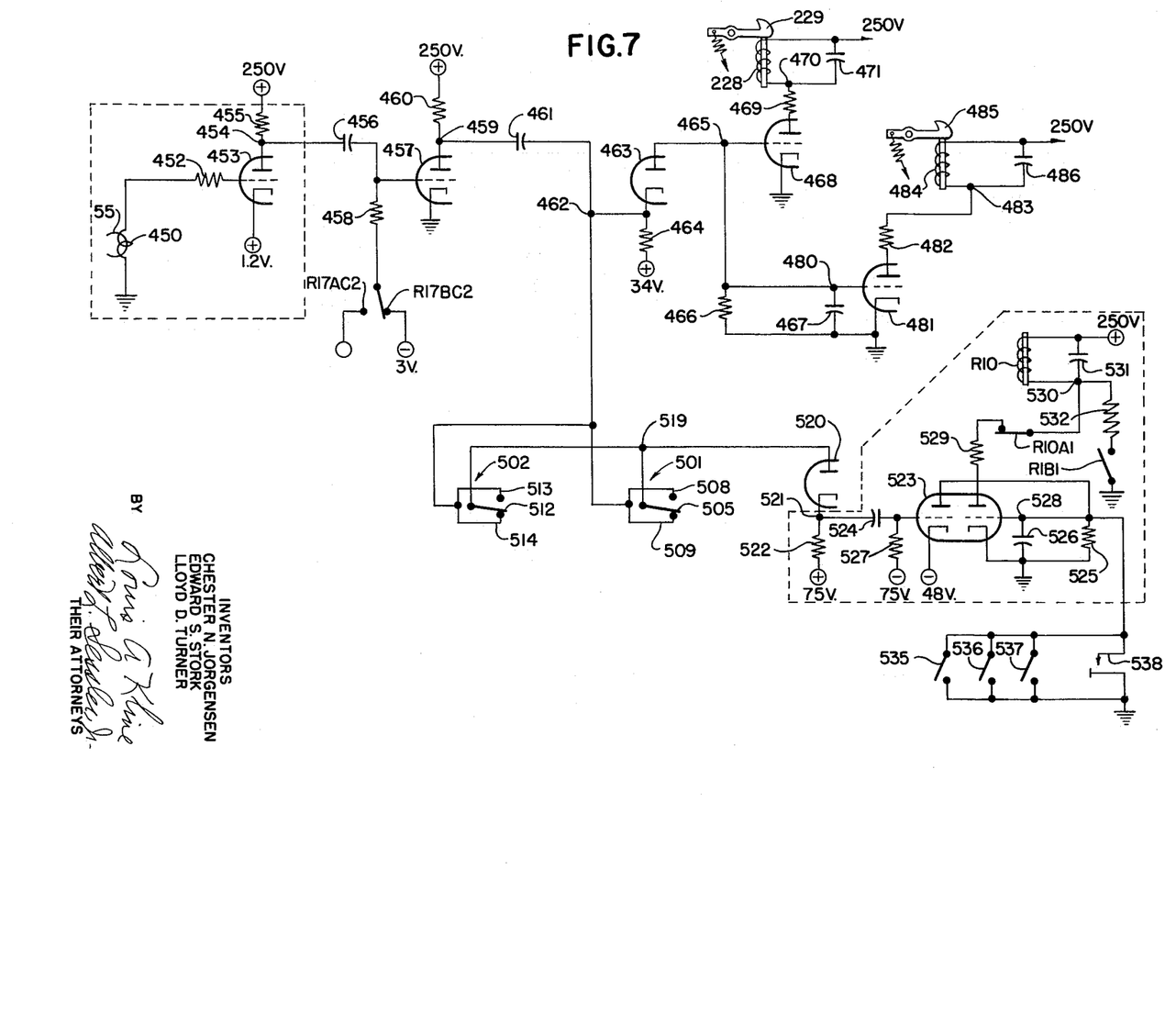
FIG. 7 is a circuit diagram showing the basic electrical circuits involved in reading and recording of account numbers carried on the magnetic ledger card.

The reading circuit shown in FIG. 7 for each comparator channel has two modes of operation, one when reading a card during any in-sweep of the carriage of the accounting machine to control the setting of its associated auxiliary differential mechanisms, and the other when reading the card during the return movement of the card to starting position, to control the check-back circuit. The operation of the circuit as it reads data on the in-sweep of the card will be considered first.

The polarity of the magnetization of the channel and the winding of the coil 450 of the reading head 55 are such that a negative pulse of about 0.07 volt is generated in the coil 450 by the data-representing point when passing from one polarity to the other on the magnetically-encoded channel during the in-sweep of the card 51 past the heads.

The reading head 55 has one side of its coil 450 connected to the ground and has the other side of its coil connected over a 100,000-ohm resistor 452 to the control electrode of the pre-amplifier or first amplifier tube 453, which is half of a 5751 type of tube. The tube has its cathode connected to a source of +1.2 volts and has its anode connected over a point 454 and a 470,000-ohm resistor 455 to a +250-volt anode potential supply. This tube is normally conducting to such an extent that it can be controlled by both negative and positive signals from the head 55 to amplify these signals.

The point 454 in the anode circuit of the tube 453 is coupled over a 0.03-microfarad capacitor 456 to the control electrode of the second amplifier tube 457, which is half of a 6SL7 type of tube. The control electrode of the tube 457 is supplied with a −3-volt bias by being connected over a one-megohm resistor 458 and contacts R17BC2, which are closed during the in-sweep of the card, to a −3-volt bias potential supply. The cathode of the tube 457 is grounded, and the anode of said tube is connected over a point 459 and a 270,000-ohm resistor 460 to a +250-volt anode potential supply. With this bias, the tube 457 is cut off.

The point 459 in the anode circuit of the tube 457 is coupled over a 0.03-microfarad capacitor 461 and a point 462 to the cathode of a diode 463, which is half of a 6H6 type of tube. The cathode of the diode 463 is also connected over a one-megohm resistor 464 to a +34-volt source of potential. The anode of the diode 463 is connected to ground over a point 465, and a parallel combination of a 4.7-megohm resistor 466 and a 0.005-microfarad capacitor 467. With these potentials applied to the anode and cathode of the diode, the diode will normally be non-conducting.

Point 465 in the anode circuit of the diode 463 is connected to the control electrode of a tube 468, which is half of a 6SN7 type of tube. With the diode 463 non-conducting, ground potential is supplied to the control electrode of the tube 468 from point 465. The tube 468 has its cathode grounded and has its anode connected over a 4,700-ohm resistor 469, a point 470, and a solenoid 228 to a +250-volt anode supply. A 0.002-microfarad capacitor 471 is connected across the solenoid 228 to prevent a high-voltage surge when the solenoid is de-energized.

The tube 468 is normally conducting and will maintain the solenoid 228 energized to hold the pawl 229 out of enagement with the teeth in the corresponding segment of the auxiliary differential mechanism so long as the tube conducts.

At a point 480, corresponding to the point 465, the anode circuit of the diode 463 is connected to the control electrode of a tube 481, which is also half of a 6SN7 type of tube. From the point 480, ground potential is supplied to the control electrode of the tube 481 as long as the diode 463 is non-conducting. The tube 481 has its cathode grounded and has its anode connected over a 4,700-ohm resistor 482, a point 483, and a solenoid 484 to a +250-volt anode supply. The 0.002-microfarad capacitor 486 is connected across the solenoid 484 to prevent a high-voltage surge when the solenoid is deenergized.

The tube 481 is normally conducting and will maintain the solenoid 484 energized to hold the pawl 485 out of engagement with the teeth in the corresponding segment of the auxiliary differential mechanism as long as the tube conducts.

The operation of the circuit is as follows:

As the card is being fed past the head 55 during the insweep of the card, a negative pulse of about 0.007 volt is generated in the head when the polarity of the magnetization in the channel changes. This pulse is amplified and inverted by the tube 453 to produce a positive pulse of approximately 3.5 volts at the point 454 in its anode circuit. The +35-volt pulse at point 454 is applied over the capacitor 456 to the control electrode of the tube 457, causing the tube 457 to conduct heavily and to produce a −140-volt pulse at point 459 in the anode circuit of the tube 457. The −140-volt pulse at point 459 is applied over the capacitor 461 and the point 462 to the cathode of the diode 463, which cathode is at +34 volts. As long as the cathode of the diode 463 is at +34 volts and the anode is at ground potential, there will be no conduction in the diode, and the control electrode of the control tube 468 will remain at substantially ground potential, allowing the tube 468 to conduct. When the −140-volt pulse is applied to the cathode of the diode 463, it will cause the diode to conduct and apply a negative impulse of approximately 96 volts to the control electrode of the control tube 468, causing the control tube 468 to be cut off, thereby deenergizing the solenoid 228. The combination of the resistor 466 and the capacitor 467 allows the negative pulse to be applied quickly to the control tube and enables its effect to be maintained for sufficient time to insure that the solenoid 228 is deenergized and the pawl 229 is completely released before the tube 468 resumes conduction. This effects setting of the auxiliary differential mechanism 226 of FIG. 3 in the manner previously described.

At the same time that the conduction of the tube 468 is terminated and said tube is cut off, the same negative pulse is applied over the point 480 to the control electrode of the tube 481, thereby also causing the tube 481 to be cut off. This results in the deenergization of the solenoid 484 and the complete release of the pawl 485 before the tube 481 resumes conduction. Release of the pawl 485 sets the comparator number auxiliary differential mechanism, which stores the number sensed, for comparison with the corresponding order of a comparator number manually indexed on the comparator number keyboard 87 (FIG. 1), by means of the keys 88. The comparator number auxiliary differential mechanism and the means for effecting comparison between the comparator number sensed from the card 51 and the number indexed on the keyboard 87 are not shown herein, but are fully described in the previously mentioned Patent No. 2,947,-475.

The anode supply circuits for the tubes 457 and 468 are identical to those shown for the tubes 116 and 118 respectively, in the previously-mentioned Patent No. 2,947,475, and for a detailed description of these circuits, reference may be had thereto.

The operation of the circuit of FIG. 7 as it reads comparator data from a card 51 during the return sweep of the card will now be explained.

Near the end of the in-sweep movement of the card, and after the data has been read therefrom, a relay in the accounting machine (not shown herein but disclosed in Patent No. 2,947,475) is energized and remains energized until near the end of return movement of the card. The energization of this relay opens the contacts R17BC2 to remove the −3-volt bias from the control electrode of the second amplifier tube 457, and closes contacts R17AC2 connect the control electrode to ground, thereby making the tube 457 normally conducting.

During the return movement of the card 51 past the heads 55, at the data-representing point, where the polarity of magnetization is reversed, a positive pulse of about 0.07 volt is generated in the winding 450 and is applied to the control electrode of the pre-amplifier or first amplifier tube 453, which amplifies and inverts the impulse, and produces a −3.5 volt impulse at point 454. The negative pulse at point 454 is applied to the control electrode of the second amplifier tube 457, which is conducting, and reduces conduction in the tube to produce a +140-volt impulse at point 459. This positive impulse is applied over the capacitor 461 to point 462 and the cathode of the diode 463, which is at +34 volts. Since the anode of the diode is at ground potential and the cathode is always at +34 volts, the positive impulse does not cause conduction in the diode, and consequently has no effect on the control tubes 468 or 481, or on the solenoids 228 or 484, controlled thereby.

The positive impulse which is applied to the point 462 is used in the check-back operation. As described in the previously-mentioned Patent No. 2,947,475, check-back means are provided to check the entries made into the machine under control of the ledger card 51 against the actual data which is recorded on the card. This provides a check on the operation of the machine and also provides a check that only one data-representing condition exists in each channel.

These check-back means are represented diagrammatically in FIG. 7 by a set of contacts 501 associated with the solenoid 228, and by a set of contacts 502 associated with the solenoid 484.

As explained earlier, the differential mechanism 220 (FIG. 3) sets the control plate 258 according to the account number read from the ledger card, in response to the energization of the solenoid 228 at a selected time, which in turn sets the auxiliary differential mechanism 226.

Also, in the manner fully disclosed in the previously-cited United States Patent No. 2,947,475, the solenoid 484 (FIG. 7) is operable to control the setting of an additional control plate. One solenoid 228 and one solenoid 484, and their corresponding auxiliary differential mechanisms and control plates, are provided for each channel of comparator information contained on the ledger card 51.

The setting of these plates involves their positioning about the shaft 186, so that the rise portion between the small diameter, as at 265 (FIG. 3), and the larger diameter, as at 266 of each plate, occupies a position about the shaft 186 corresponding to the digit setting of the plate.

The group of contacts 262 (FIG. 3) associated with the control plate 258, and which include the contacts 501 of FIG. 7, are mounted on a bracket 503, which is pivoted on the shaft 186 and is connected by links 504 to an arm (not shown) secured to the drive shaft 199, which drives the auxiliary differential mechanism in synchronism with the movement of the carriage of the accounting machine. The bracket 503, which normally occupies the position shown in FIG. 3, is moved counter-clockwise about the shaft 186 during the counter-clockwise operation of the shaft 199 in the first 180 degrees of operation of the auxiliary cam shaft of the accounting machine, and is returned clockwise to home position when the shaft 199 is rocked clockwise as the auxiliary cam shaft completes its second 180 degrees of operation, from 180 degrees to 360 degrees.

The movement of the card carriage of the accounting machine is synchronized with the movement of the shaft 199, being driven into the machine during the counter-clockwise movement of the shaft 199 and being returned to home position during the clockwise movement of said shaft. The bracket 503, which is also operated by the shaft 199, will move the group of contacts 262 past the related plate 258 in synchronism with the movement of the carriage of the accounting machine.

The clockwise movement of the bracket 503 during the return movement of the carriage, after the data which has been read has been entered into the machine, is used to control the check-back circuit in the following manner.

As best shown in FIG. 3, the group of contacts 262 contains two sets of contacts. An inner set of contacts contains three contact blades, which control the check-back circuit, and an outer set contains two blades, which control recording.

The set of contacts for controlling the check-back circuit will now be considered. The center blade 505 of this set is connected by an adjusting screw 506 to a roller 507, which rides on the periphery of the control plate 258. The blade 505 is so located with respect to the roller 507 that, when the roller is traversing the larger-diameter portion of the plate 258, the center blade 505 engages the outer blade 508, as shown in FIG. 3, and, when the roller 507 is traversing the smaller-diameter portion of the plate 258, the center blade 505 engages the inner blade 509 of the set of contacts 501. However, when the roller 507 is traversing the rise between the two different-diameter portions of the plate 258, which rise is positioned about the shaft 186 according to the digit setting of the plate, the center blade 505 is shifting from one of the blades 508 and 509 to the other, and will engage neither. This arrangement is diagrammatically shown in FIG. 7.

Since this shift occurs at a time which is related to the value of the digit set in the plate 258, it should occur at the same time that the impulse is generated in the head 55, which is reading the same digit representation during the return movement of the carriage.

The check-back circuit, which is controlled by the set of contacts on the bracket 503 and by the reading circuit, is shown in FIG. 7.

The outer and inner blades 508 and 509 are connected together and are connected to the point 462, which, as explained earlier, has a positive pulse of about 100 volts impressed thereon when the data-representing position in the channel is sensed during the return movement of the carriage of the accounting machine. The center contact blade 505 is connected over a point 519 to the anode of a diode 520, which is half of a 6H6 type tube. The cathode of the diode 520 is connected over a point 521 and 2.7-megohm resistor 522 to a +75-volt source of potential. With the cathode at +75 volts and the anode at +34 volts, the diode 520 will normally be non-conducting and will conduct only when the +140-volt impulse is impressed on its anode as a digit-representing condition in the channel as being read during the return movement of the carriage 111.

The set of contacts 502 controlled by the comparator number control plate (not shown) are similar in structure and operation to the contacts 501, and, as shown in FIG. 7, are connected in parallel to the contacts 501. The contacts 502 include a center contact blade 512, and outer and inner contact blades 513 and 514, respectively. The outer and inner blades 513 and 514 of the set of contacts 502 are connected to the point 462. The center contact blade 512 is connected to the point 519, which, it will be recalled, is connected to the anode of the diode 520.

It will be clear that, since the center blades 505 and 512 shift from contact with their inner blades 509 and 514, respectively, to their outer blades 508 and 513, respectively, at the digit-representing positions of their respective control plates, this shift occurs when the +140-volt pulse is impressed over the point 462 to the interconnected inner and outer blades 508, 509, and the interconnected inner and outer blades 513 and 514, by the reading circuit, and the impulse does not get through via either of the center blades 505 or 512 to the diode 520. It will be seen that, if the pulse is impressed over the point 462 to the inner and outer blades of the sets of contacts 501 and 502 when the center blade 505 or 512 of either of these sets is in contact with either the inner or the outer blades of the respective sets, it indicates that the setting of the control plates does not agree with the data being read from the card 51.

The cathodes of all of the diodes 520 relating to the three comparator channels are connected to the point 521, so that conduction in any one of the diodes will control a control tube 523 to bring about the controls which indicate a lack of agreement between comparator data stored in the machine by the setting of the control plates and the data read from the card during its return sweep.

Point 521 is coupled over a 0.03-microfarad capacitor 524 to the control electrode of the left section of the control tube 523, which is a twin triode of a 6SN7 type. The anode of the left section is connected to ground over a one-megohm resistor 525 and a 0.01-microfarad capacitor 526 in parallel. The cathode of the left section is connected to a −48-volt potential source, and the control electrode of this section is supplied with a bias by being connected over a one-megohm resistor 527 to a −75-volt source of potential. The left section is normally non-conducting.

Point 528 in the anode circuit for the left section is connected to the control electrode of the right section of the tube 523, and supplies the control electrode with ground potential so long as the left section is non-conducting. The cathode of the right section is connected to ground, and the anode is connected over a 4,700-ohm resistor 529 to the contacts R10A1 of the check-back control relay R10, and over these contacts, a point 530, and the winding of a check-back control relay R10 to a source of +250-volt anode potential. A 0.01-microfarad capacitor 531 is connected across the relay R10 to prevent a high-voltage surge when the relay is deenergized.

The check-back control relay R10 is normally energized and indicates a check-back failure whenever it is deenerized. Initial energization of the relay is effected by relay contacts R1B1, controlled by a relay (not shown) in the accounting machine, which connects the point 530 to ground over a 15,000-ohm resistor 532. The contacts R1B1 open a short time after power is supplied to the accounting machine and close momentarily in a corrective operation following a check-back failure, to reenergize the relay R10. Energization of the relay R10 closes contacts R10A1 to complete the anode circuit to the right section of the control tube 523, which section will conduct and provide a holding circuit for the relay R10.

If the positive pulse from the card-reading circuit occurs when either of the center blades 505 or 512 is contacting either of the blades 508, 509, or 513, 514, respectively, indicating a check-back failure, the diode 520 will conduct and cause a positive pulse at the point 521. The positive pulse at the point 521 will be effective to cause the left section of the control tube 523 to conduct and supply a negative pulse to the control electrode of the right section to cut off the right section and thereby deenergize the relay R10, which in turn opens the contacts R10A1 to interrupt the anode circuit for the right section of the control tube 523. Once the relay R10 is deenergized, it will remain deenergized until the contacts R1B1 reclose when the relay controlling these contacts is deenergized in the corrective operation of the machine which follows the operation in which the check-back failure occurred. Deenergization of the relay R10 is effective, by means which are fully disclosed in the previously-cited United States Patent No. 2,947,475, to energize the gate-check solenoid to effect a gate-check condition of the accounting machine. The manner in which this is accomplished is fully described in the previously-cited patent and therefore will not be explained herein.

In order to disable the check-back control circuit in those operations in which the check-back control is not desired, the right section of the control tube 523 is rendered ineffective to control the relay R10 regardless of any signal which may be applied to its control electrode. This is accomplished by connecting the point 528 to ground over any one of four contacts 535, 536, 537, and 538, in parallel.

The contacts 535 close during a pawl check failure to prevent deenergization of the relay R10 at such a time. The contacts 536 close to prevent energization of the relay R10 while a manual line-finding operation is employed. The contacts 537 close to prevent deenergization of the relay R10 during a storage cycle of the accounting machine. The contacts 538 are cam-controlled contacts, which are closed by a cam on the auxiliary cam shaft of the machine at 315 degrees of one operation of the shaft and which remain closed until 225 degrees of the next operation of the shaft. These contacts insure that the check-back circuit will not be effective during the insweep of the card 51 but will be effective only during the return movement of the card carriage of the accounting machine when it is desired to check the setting of the control plates with the data read from the card.

The check-back circuit, therefore, re-reads the card and compares this reading with the setting of the cam plates to insure that the data which was read from the card has been properly entered into the machine.

As an incident to the operation of checking the correctness of the setting of the machine, the check-back circuit will also verify the fact that no more than one digit-representing condition is present in the channel. This stems from the fact that the channels are read from the top to the bottom of the card during the insweep of the card, and the first digit-representing condition which is sensed in the channel will control the setting of the control plates, whereas the channels are read from the bottom toward the top of the card during the return sweep of the card when the check-back circuit is effective, and any additional digit representation will be sensed first and will occur at a point different from the one which caused the setting of the control plates and will cause the control tube 523 to be cut off and thereby deenergize the relay R10, thus giving a signal that a check-back failure has occurred.

Figure 5:
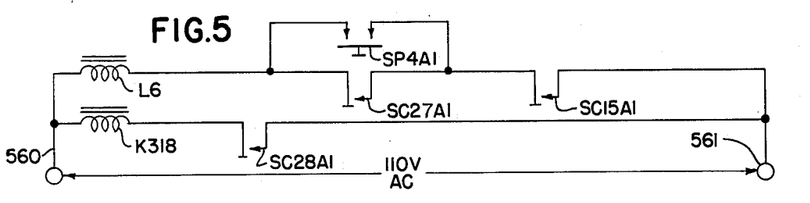
FIGS. 5 and 6 are circuit diagrams showing various control circuitry utilized in the present invention.
Figure 6:
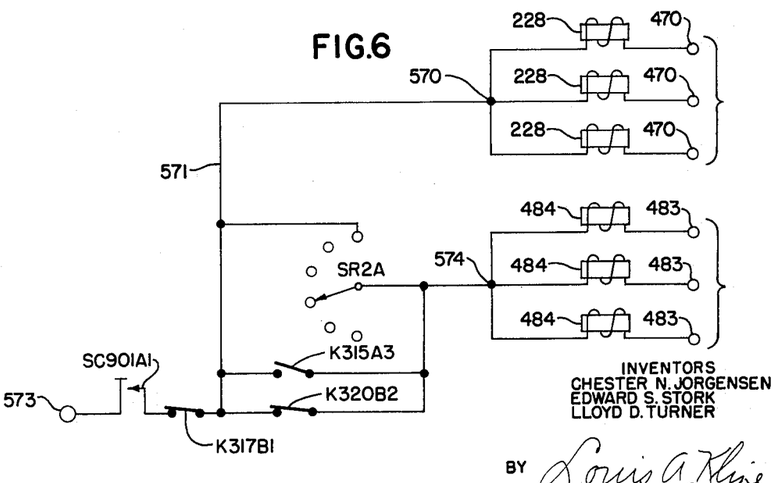

*Additional control circuits.*—Some additional control circuits for effecting the functioning desired in the improved accounting machine of the present invention are shown in FIGS. 5 and 6. These circuits are associated with additional circuitry in the accounting machine which has not been changed from circuitry employed in the embodiment of the machine disclosed in the previously-mentioned Patent No. 2,947,475. A description of the conventional circuitry will therefore not be repeated herein, but reference may be had to said patent for a complete description of such circuitry.

The solenoid L6 shown in FIG. 5 is the disable comparator print solenoid. When energized, this solenoid is effective to disable certain of the printing hammers to prevent printing of an account number on the journal sheet, in the manner shown in FIG. 4 and previously described. It is desired to disable the hammers which are normally effective to print an account number on the journal sheet in the event that the comparator means of the accounting machine is to be disabled, since often in such cases an erroneous account number or comparator number will be sensed from the ledger card 51. Energization of the solenoid L6 is controlled over the circuit which extends from the conductor 560 over the solenoid L6, the contacts SC27A1 in parallel with the contacts SP4A1, and the contacts SC15A1 connected in series to the parallel combination, to the conductor 561. In order to energize the solenoid L6, the disable comparator button (not shown) is depressed, thus closing the contacts SP4A1. This conditions the energizing circuit for the solenoid L6 so that when the contacts SC15A1 close, as they do when the machine is cycled through a balance pickup operation, the solenoid L6 is energized. Energization of the solenoid L6 is effective, as shown in FIG. 4 and previously described, to close the contacts SC27A1, thus completing a holding circuit for the solenoid L6 which will maintain said solenoid in energized condition even though the disable comparator button is released, thus opening the contacts SP4A1. The energizing circuit for the solenoid L6 remains completed until the contacts SC15A1 open at the end of a balance pickup operation.

The solenoid L6 is also effective to operate the contacts SC28A1, which energize a comparator relay K318 (FIG. 6). This relay is effective through circuitry which has been described in the previously-cited United States Patent No. 2,947,475 to prevent a short cycle of the accounting machine in which the card 51 is ejected from the machine due to a comparator failure.

Shown in FIG. 6 are certain circuits for controlling the operation of the latch pawl magnets of various auxiliary differentials, corresponding to certain of the various channels of information stored on the magnetic ledger cards 51.

FIG. 6 may be related to the card-reading circuits for the various channels by noting that the points 470 and 483, adjacent the magnets 228 and 484 (FIG. 7) relating to the comparator channels, are shown in a similar relation in FIG. 6. Also, it may be noted that the circuits of FIG. 6 relating to the comparator circuit channels continue to the source of +250-volt potential and are represented in FIG. 7 by the arrows to the right of the magnets 228 and 484.

It will be seen that the magnets 228, which are connected at one end to points 470, are arranged in parallel combination, said combination being connected at point 570 to a common 571, which in turn is connected through normally open contacts K317B1 and contacts SC901A1 to a +250-volt terminal 573.

The magnets 484 are arranged in parallel combination between the points 483 and a point 574. Three different parallel circuit paths are provided between the point 574 and the common 571. A first path extends through the switch SR2A, controlled by the function control knob 100 (FIG. 1) of the accounting machine, and is so connected that this path is completed only when the function control knob 100 is in "Install" position. A second path extends through the normally open contacts K315A3, which are controlled by a relay K315 in the accounting machine, and a third path extends through the normally closed contacts K320B2, controlled by relay K320 in the accounting machine. The operating circuits for controlling the relays K315 and K320 are described in the previously-mentioned United States Patent No. 2,947,475.

The control circuits of FIG. 6 for the comparator magnets 484 operate in substantially the same manner as disclosed for these magnets in the previously-cited United States Patent No. 2,947,475.

With regard to the magnets 228 controlling the comparator print auxiliary differential mechanisms, it may be seen from FIG. 6 that the circuits for controlling these magnets are such that the +250-volt potential is applied to points 470 whenever both the relay contacts K317B1 and the contacts SC901A1 are closed. The contacts SC901A1 are controlled by the auxiliary cam line of the accounting machine and are closed between 5 degrees and 355 degrees of the operation cycle of that cam line.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In an apparatus adapted to be controlled according to balances and control numbers recorded on ledger cards, and capable of recording balance and control number data on a journal, the combination of means to sense a control number from the ledger card; means controlled by the control number sensing means and operable according to the control number sensed from the ledger card to enable comparison of the control number sensed from the card with a control number manually set into the apparatus; differentially operable means also controlled by the control number sensing means and settable to represent a numerical value according to the control number sensed; movable printing means having a plurality of type characters and controlled by the setting of the differentially operable means for printing of the control number on the journal; and disabling means operable to disable the printing means to prevent printing of the control number on the journal.

2. In an apparatus adapted to be controlled according to balances and control numbers recorded on ledger cards, and capable of recording balance and control number data on a journal, the combination of means to sense a control number from the ledger card; first solenoid means controlled by the control number sensing means and operable according to the control number sensed from the ledger card to establish a condition for comparison of the control number sensed from the card with a control number manually set into the apparatus; second solenoid means controlled by the control number sensing means; differentially operable means controlled by the second solenoid means and settable to represent a numerical value according to the control number sensed; and movable printing means having a plurality of type characters and controlled by the setting of the differentially operable means for printing of the control number on the journal.

3. In an apparatus adapted to be controlled according to balances and control numbers recorded on ledger cards, and capable of recording balance and control number data on a journal, the combination of means to sense a control number from the ledger card; means controlled by th control number sensing means and operable according to the control number sensed from the ledger card to enable comparison of the control number sensed from the card with a control number manually set into the apparatus; differentially operable means also controlled by the control number sensing means and settable to represent a numerical value according to the control number sensed; and movable printing means having a plurality of type characters and controlled by the setting of the differentially operable means for printing of the control number on the journal.

References Cited by the Examiner

UNITED STATES PATENTS

| 2,275,609 | 3/1942 | Bryce | 235—61.11 |
| 2,427,383 | 9/1947 | Bryce | 235—61.7 |

MALCOLM A. MORRISON, *Primary Examiner.*